United States Patent
Lu et al.

(10) Patent No.: US 7,275,286 B2
(45) Date of Patent: Oct. 2, 2007

(54) PIVOT DEVICE

(75) Inventors: Sheng-Nan Lu, Shulin (TW); Hsiang-Chi Chien, Shulin (TW); Chia-Hsiang Chen, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 287 days.

(21) Appl. No.: 11/179,594

(22) Filed: Jul. 13, 2005

(65) Prior Publication Data

US 2007/0011848 A1   Jan. 18, 2007

(51) Int. Cl.
*E05D 11/08* (2006.01)

(52) U.S. Cl. ............................... 16/340; 16/332; 16/335

(58) Field of Classification Search .................. 16/340, 16/337, 338, 325, 331, 332 X, 333 X–335 X, 16/286; 361/680–683; 455/575.1, 575.3, 455/575.4, 575.8, 550.1, 90.3; 348/373, 348/333.06; 248/919–923
See application file for complete search history.

(56) References Cited

U.S. PATENT DOCUMENTS

| | | | | |
|---|---|---|---|---|
| 4,846,536 A | * | 7/1989 | Saitou et al. ................ | 361/682 |
| 5,077,551 A | * | 12/1991 | Saitou ......................... | 345/207 |
| 6,108,868 A | * | 8/2000 | Lin ............................. | 16/340 |
| 6,230,365 B1 | * | 5/2001 | Lu ............................... | 16/342 |
| 6,421,878 B1 | * | 7/2002 | Kaneko et al. .............. | 16/330 |
| 6,470,532 B2 | * | 10/2002 | Rude .......................... | 16/335 |
| 6,481,057 B2 | * | 11/2002 | Lin ............................. | 16/340 |
| 6,505,382 B1 | * | 1/2003 | Lam et al. .................... | 16/325 |
| 6,708,370 B2 | * | 3/2004 | Shih et al. ................... | 16/332 |
| 6,779,234 B1 | * | 8/2004 | Lu et al. ..................... | 16/340 |
| 7,047,599 B2 | * | 5/2006 | Oshima et al. .............. | 16/337 |
| 2004/0025298 A1 | * | 2/2004 | Yang et al. .................. | 16/340 |
| 2004/0125552 A1 | * | 7/2004 | Song .......................... | 361/683 |

FOREIGN PATENT DOCUMENTS

| JP | 08014248 A | * | 1/1996 |
|---|---|---|---|
| JP | 2005084255 A | * | 3/2005 |

\* cited by examiner

*Primary Examiner*—Chuck Y. Mah
(74) *Attorney, Agent, or Firm*—Rosenberg, Klein & Lee (57) ABSTRACT

A pivot device has a pivot axle fastened on a cover of a lap top computer, a seat fastened on a chassis of the computer, and a first ring and a second ring respectively mounted around the pivot axle. The second ring and an elastic device are respectively mounted on the seat, and the second ring has two cutouts. Two lugs are respectively defined on the first ring and correspond to the cutouts. A nub is formed on an outer circumference of the first ring so that the nub presses against the elastic device. Hence, the cutouts are mated with the lugs by pushing so that the cover can be raised or lowered to the chassis and can be controlled to prevent colliding with the chassis.

7 Claims, 12 Drawing Sheets

PIVOT DEVICE

BACKGROUND OF THE INVENTION

1. Field of the Invention

The present invention relates to a pivot device, and more particularly to a pivot device which is used in a lap top computer to enable a cover of the computer to be raised or lowered safely to a chassis.

2. Description of Related Art

At least one conventional pivot device is mounted between a chassis and a cover of a lap top computer so that the cover can be raised or lowered safely to the chassis. The conventional pivot device comprises a first positioning block which has a convex portion and a second positioning block which has a concave portion. A pivot axle which has a substantially circular cross section with two opposed flats and is configured to mate with and drive the first positioning block. Furthermore, the first positioning block is mated with the second positioning block to achieve a positioning effect when the cover is lowered to the chassis.

However, the cover includes an LCD screen on its underside and extensive components such that it is particularly heavy for its size such that when it is pivoted towards the chassis it may then drop with alarming acceleration. This situation may lead to very serious damage to the screen and even a loss of data should the internal components be harmed. Therefore, the invention provides a pivot device to mitigate or obviate the aforementioned problems.

SUMMARY OF THE INVENTION

The main objective of the present invention is to provide a pivot device with which it is easy for a cover of a lap top computer to be lowered smoothly and safely to a chassis of the lap top.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
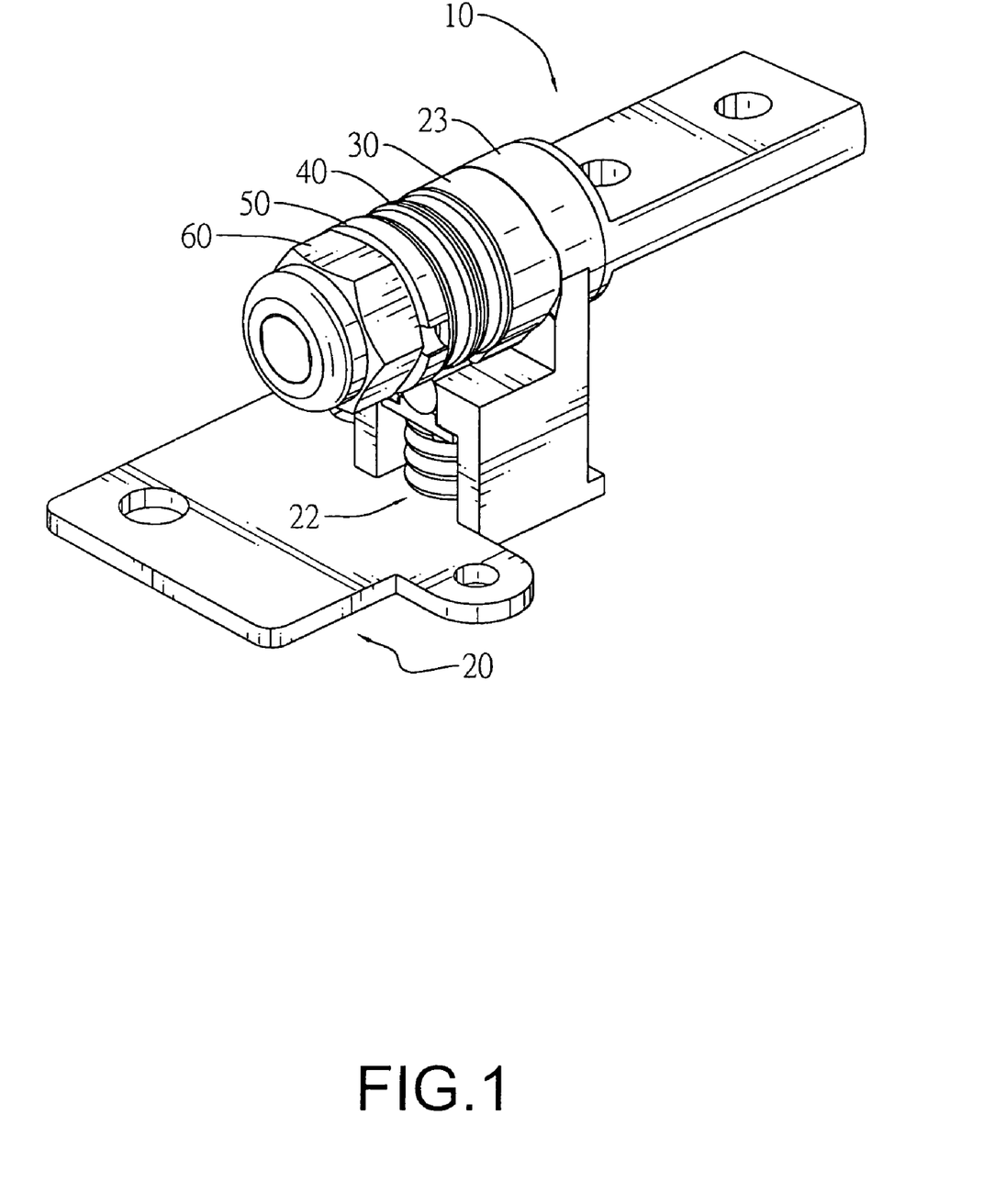
FIG. 1 is a perspective view of a first preferred embodiment of a pivot device in accordance with the present invention.
Figure 2:
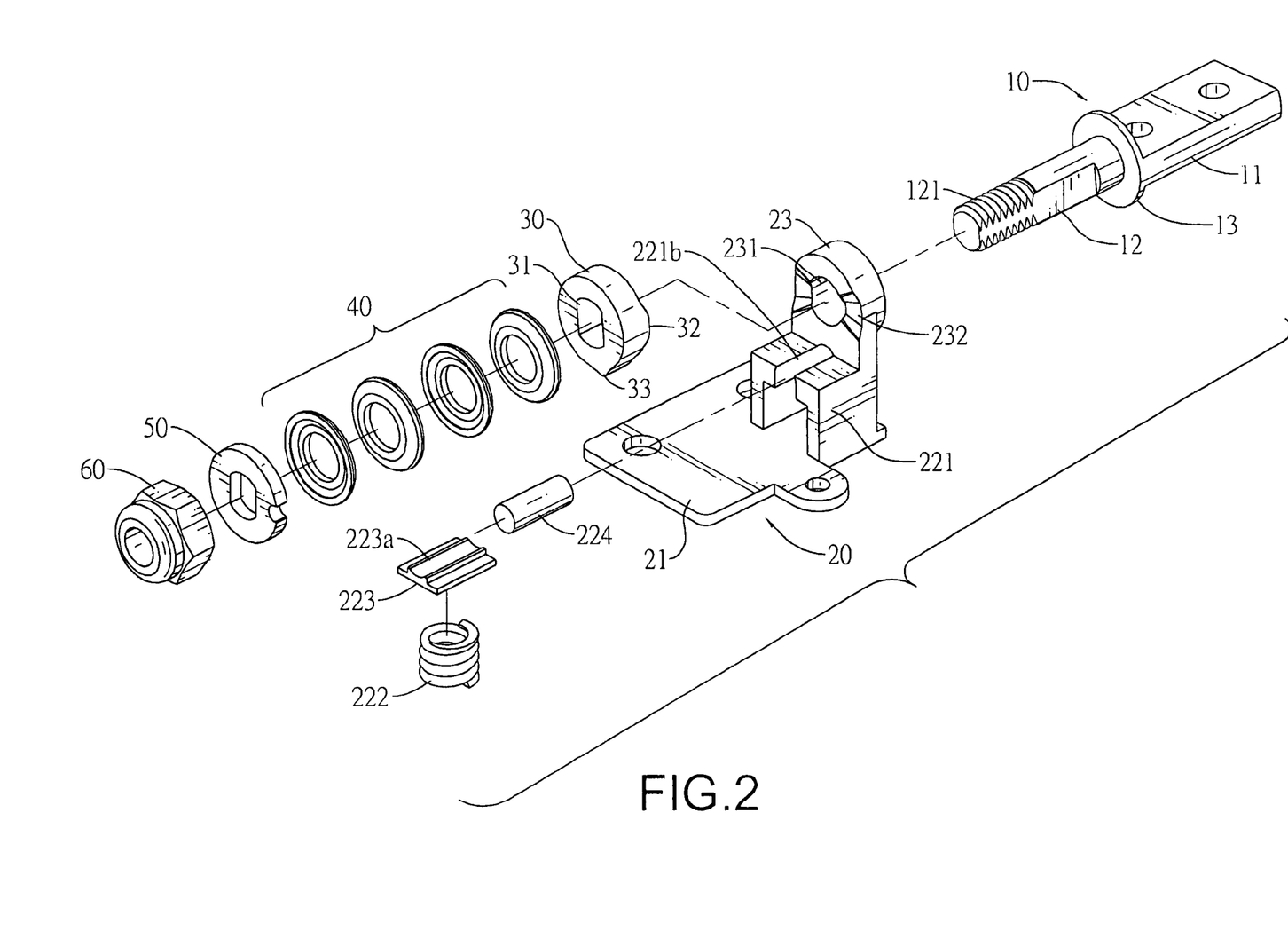
FIG. 2 is an exploded perspective view of the first preferred embodiment of the pivot device in accordance with the present invention.

With reference to FIGS. 1-2, a first preferred embodiment of a pivot device comprises a pivot axle (10), a seat (20), a first ring (30), multiple resilient disks (40) each of which has an aperture, a washer (50) and a fastener (60).

The pivot axle (10) has a plate (11) formed at a first end thereof, and a shank (12) formed at a second end thereof and opposed to the first end. The shank (12) is formed as a truncated circle in cross-section, i.e., two arcuate sides are opposed to each other, and two evenly-spaced flat sides are respectively adjacent to the arcuate sides. A thread (121) is formed in a distal end of the shank (12) and a flange (13) is formed between the plate (11) and the shank (12).

The seat (20) has a flat base (21) and an elastic device (22) is provided on the base (21). A second ring (23), which is upwardly formed on a top end of the elastic device (22), has a hole (231) defined in a center thereof, and two evenly-spaced cutouts (232) respectively defined in communication with the hole (231) and facing the elastic device (22) in a first side of the second ring (23). Each cutout (232) has two arcuate ends and the second ring (23) receives the pivot axle (10) in the hole (231) and a second side of the second ring (23) opposed to the cutouts (232) abuts the flange (13).

The elastic device (22) has a substantially cubic block (221) integrally formed on the base (21). A gap (221b) is defined in a top end of the block (221) and communicates with a chamber defined by the block (221). A rod (224) is mounted in the gap (221b). A coil spring (222) is received in the block (221) and a finned board (223) is mounted between an inner top wall of the block (221) and the spring (222). A channel (223a) is defined in a top side of the fin (223) and faces an inner top wall of the block (221) and the rod (224) is mounted adjacent to the fin (223) and engaged with the channel (223a).

The first ring (30), which is provided on the elastic device (22) has an opening (31) in a center thereof and the opening (31) is configured to mate with the shank (12) and the shank (12) is inserted into the opening (31) so that the pivot axle (10) can not rotate in an axial direction relative to the first ring (30). Two opposed lugs (32) corresponding to and facing the cutouts (232) are respectively formed on a same side of the first ring (30) and each have two arcuate ends and the respective two arcuate ends are opposed to each other. A nub (33) parallel to the rod (224) is formed on an outer circumference of the first ring (30) and the nub (33) can abut the elastic device (22).

Furthermore, the shank (12) is inserted into the resilient disks (40) via the apertures of the disks (40), the washer (50) and the fastener (60) in turn. In the first preferred embodiment of the pivot device, the fastener (60) is a nut which is engaged with the male thread (121).

Figure 3:
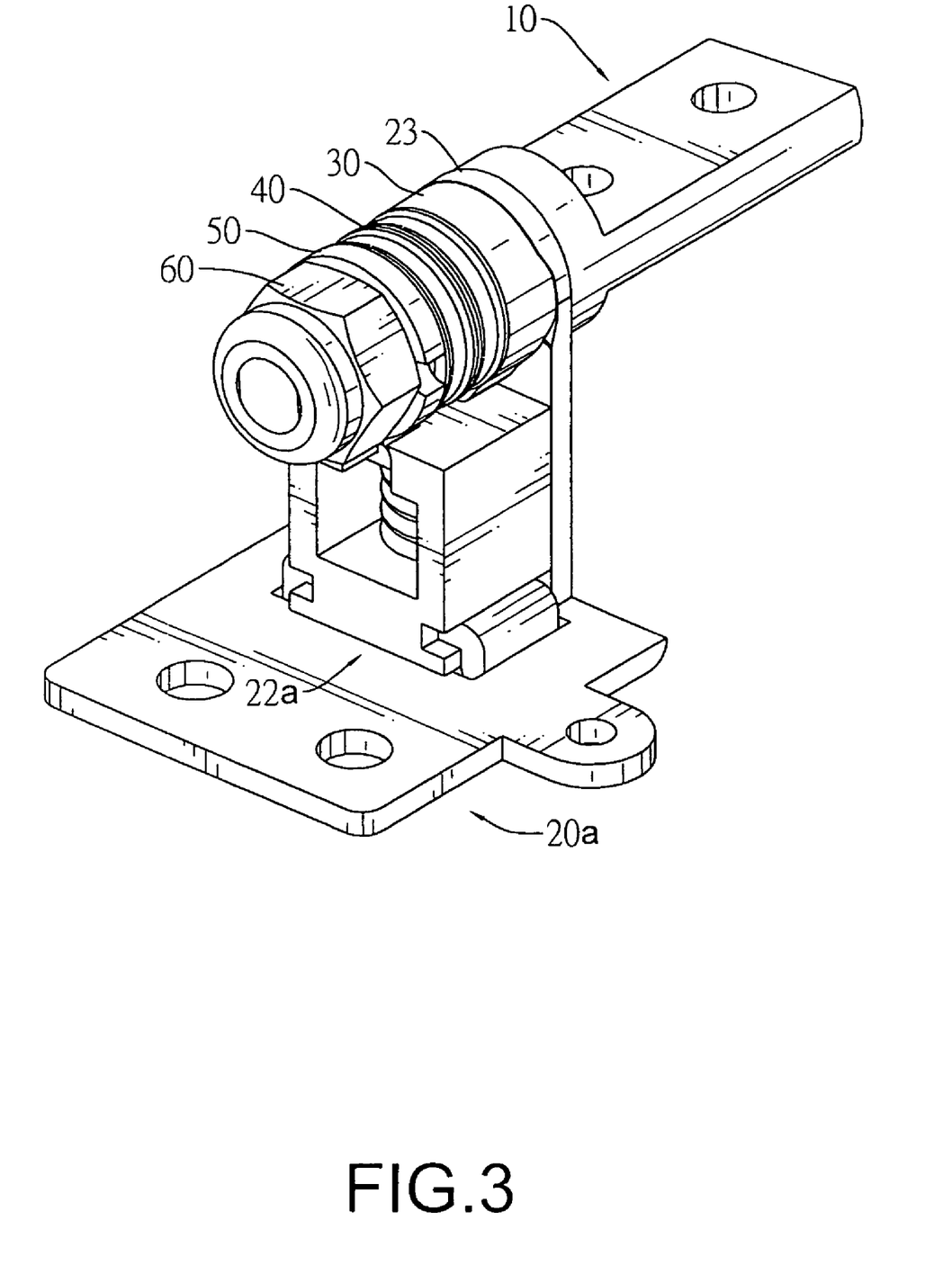
FIG. 3 is a perspective view of a second preferred embodiment of a pivot device in accordance with the present invention.
Figure 4:
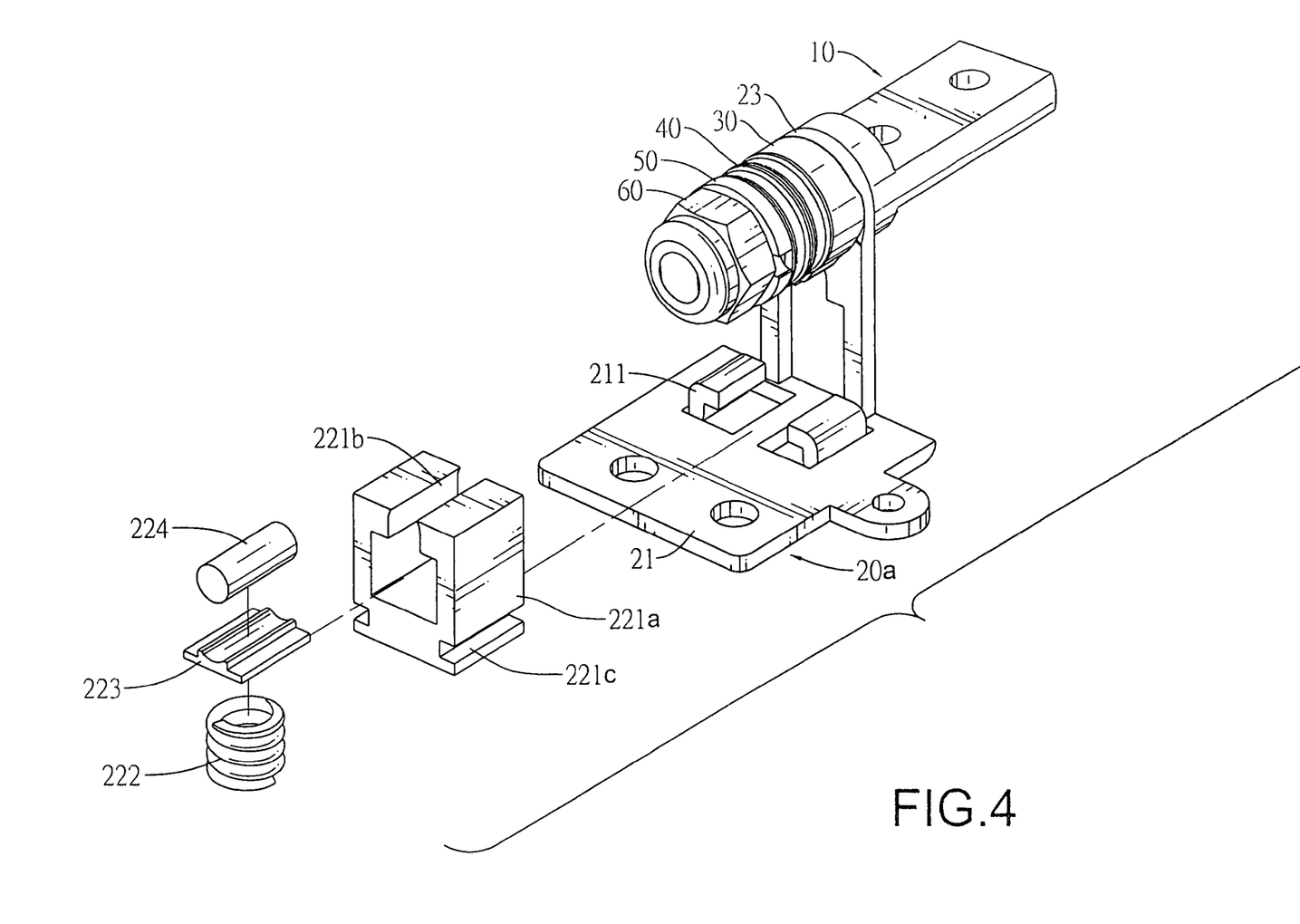
FIG. 4 is an exploded perspective view of the second preferred embodiment of the pivot device in accordance with the present invention.
Figure 5:
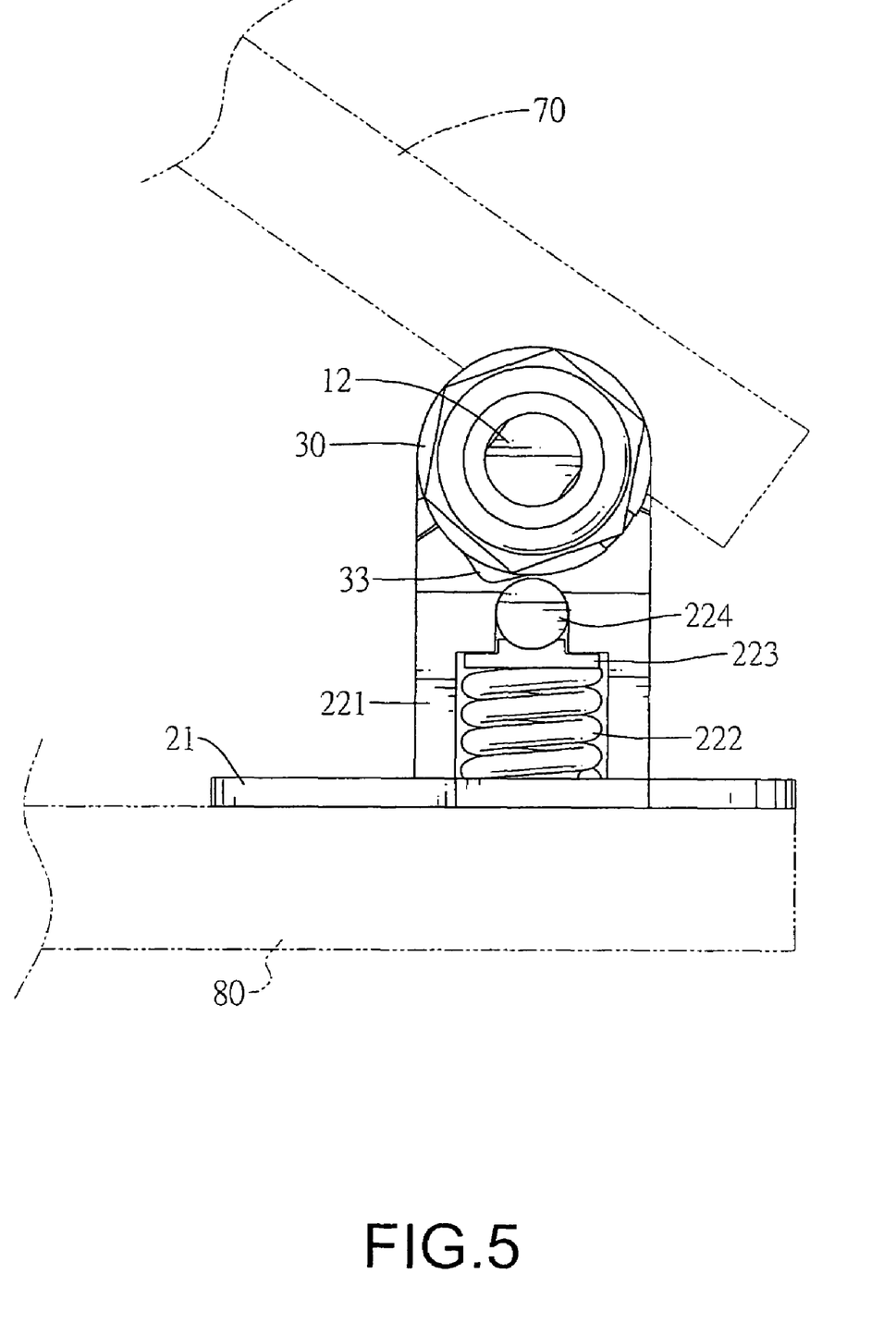
FIG. 5 is a side view of the first preferred embodiment of the pivot device in accordance with the present invention in usage.
Figure 6:
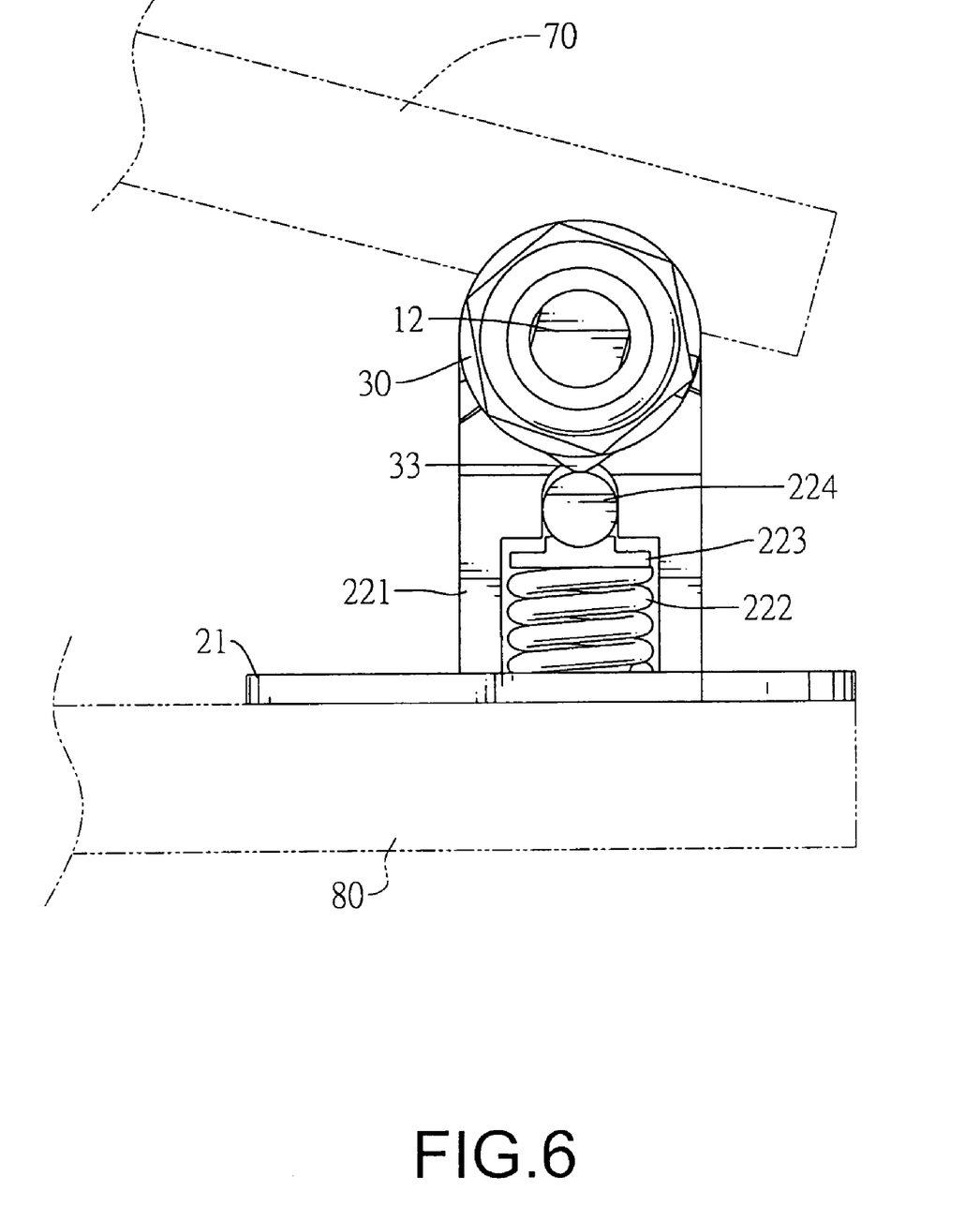
FIG. 6 is a side view of the first preferred embodiment of the pivot device in accordance with the present invention in usage.
Figure 7:
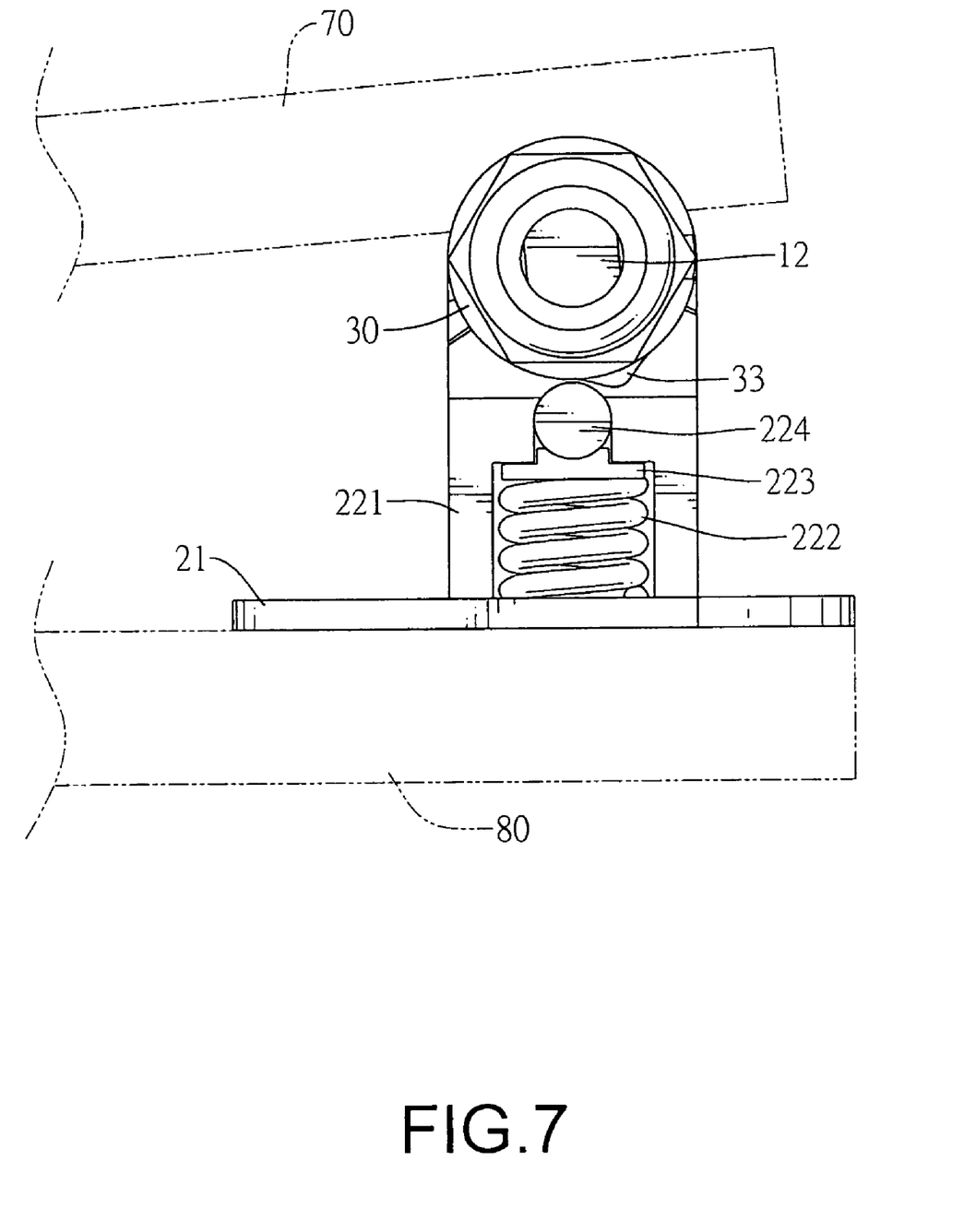
FIG. 7 is a side view of the first preferred embodiment of the pivot device in accordance with the present invention in usage.

Additionally, with reference to FIGS. 3-4, a second preferred embodiment of the pivot device is similar to the first preferred embodiment except that two parallel guide blocks (211) are upwardly formed on the base (21) of a seat (20a) and a block (221a) of an elastic device (22a) has two parallel slide rails (221c) respectively formed on two opposed sides of the block (221a). The slide rails (221c) are respectively inserted into and mated with the guide blocks (211) so that the block (221a) is securely fastened on the base (21).

With reference to FIGS. 2-5, the plate (11) is securely mounted on a cover (70) of a lap top computer and the base (21) is provided on a chassis (80) of the computer. When the cover (70) pivots relative to the chassis (80), the plate (11) is driven via movement of the cover (70). Because the shank (12) is configured to mate with the opening (31), the first ring (30) is driven to rotate by the pivot axle (10). Furthermore, the cover (70) can be raised 180 degrees relative to the chassis (80) or lowered 180 degrees relative to the chassis (80) for positioning when one of the two cutouts (232) is mated with one of the two lugs (32).

With reference to FIGS. 2 and 5-7, when the cover (70) is being lowered to the chassis (80) and a certain portion of the lug (32) is inserted into the cutout (232), the coil spring (22) is compressed against the rod (224) with the finned board (223), and the nub (33) is pressed by the rod (24) so that the nub (33) should be pressed against the rod (224) downwardly by a user to overcome the upward resilient force of the coil spring (222). Hence, the cover (70) can be pivoted relative to and lowered to the chassis (80) smoothly to prevent the cover (70) from colliding with and damaging the chassis (80).

Figure 8:
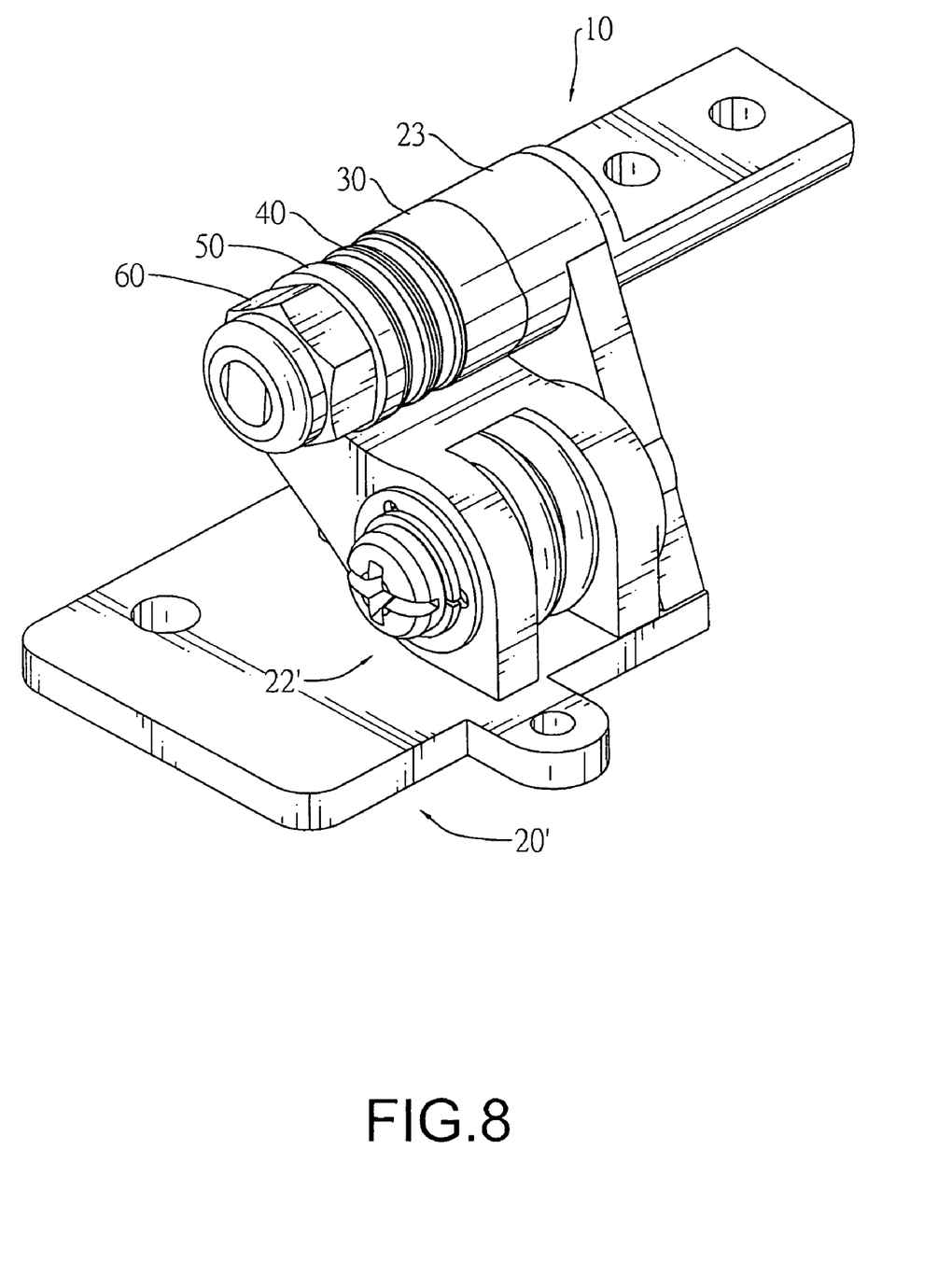
FIG. 8 is a perspective view of a third preferred embodiment of a pivot device in accordance with the present invention.
Figure 9:
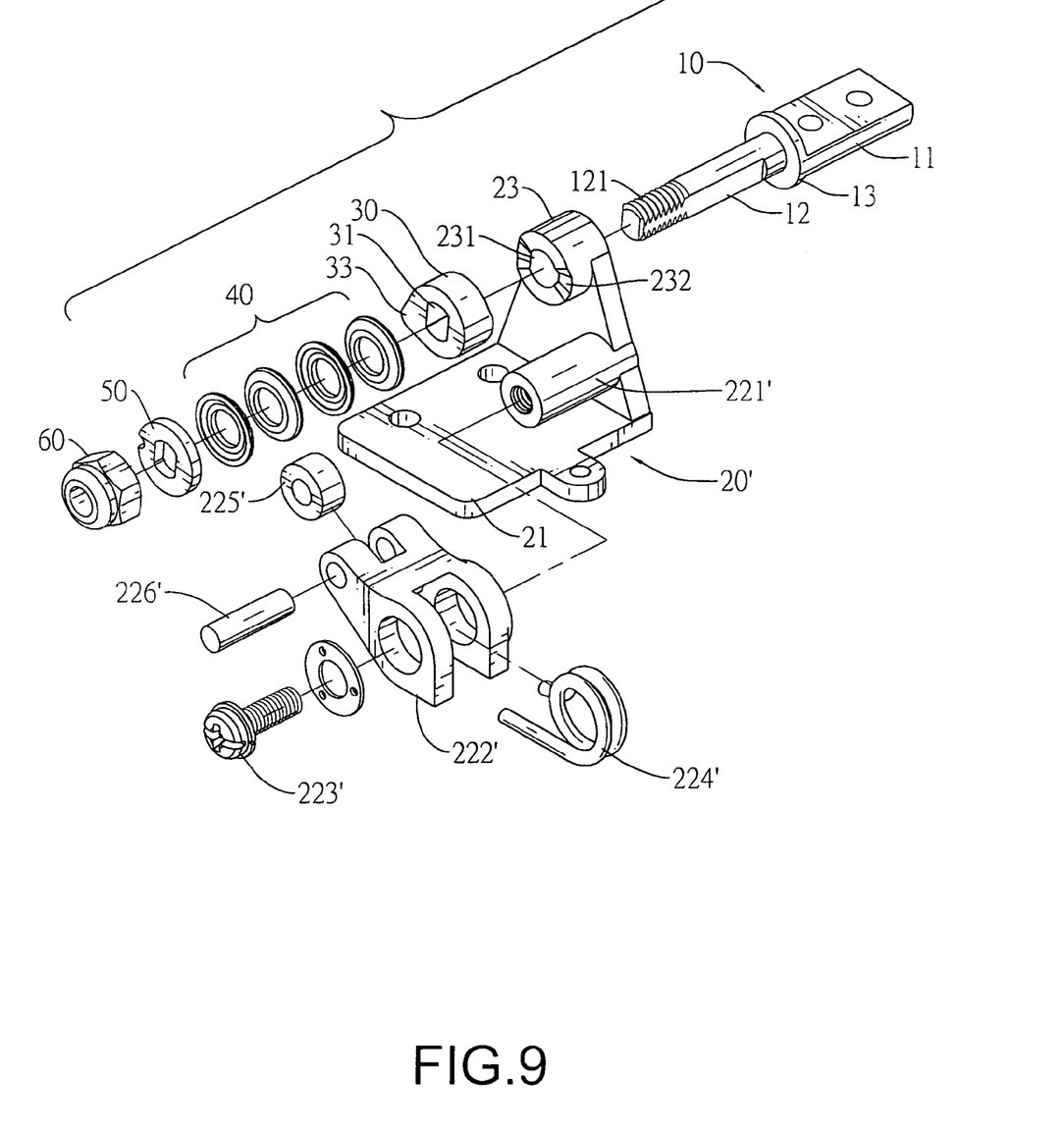
FIG. 9 is an exploded perspective view of the third preferred embodiment of the pivot device in accordance with the present invention.
Figure 10:
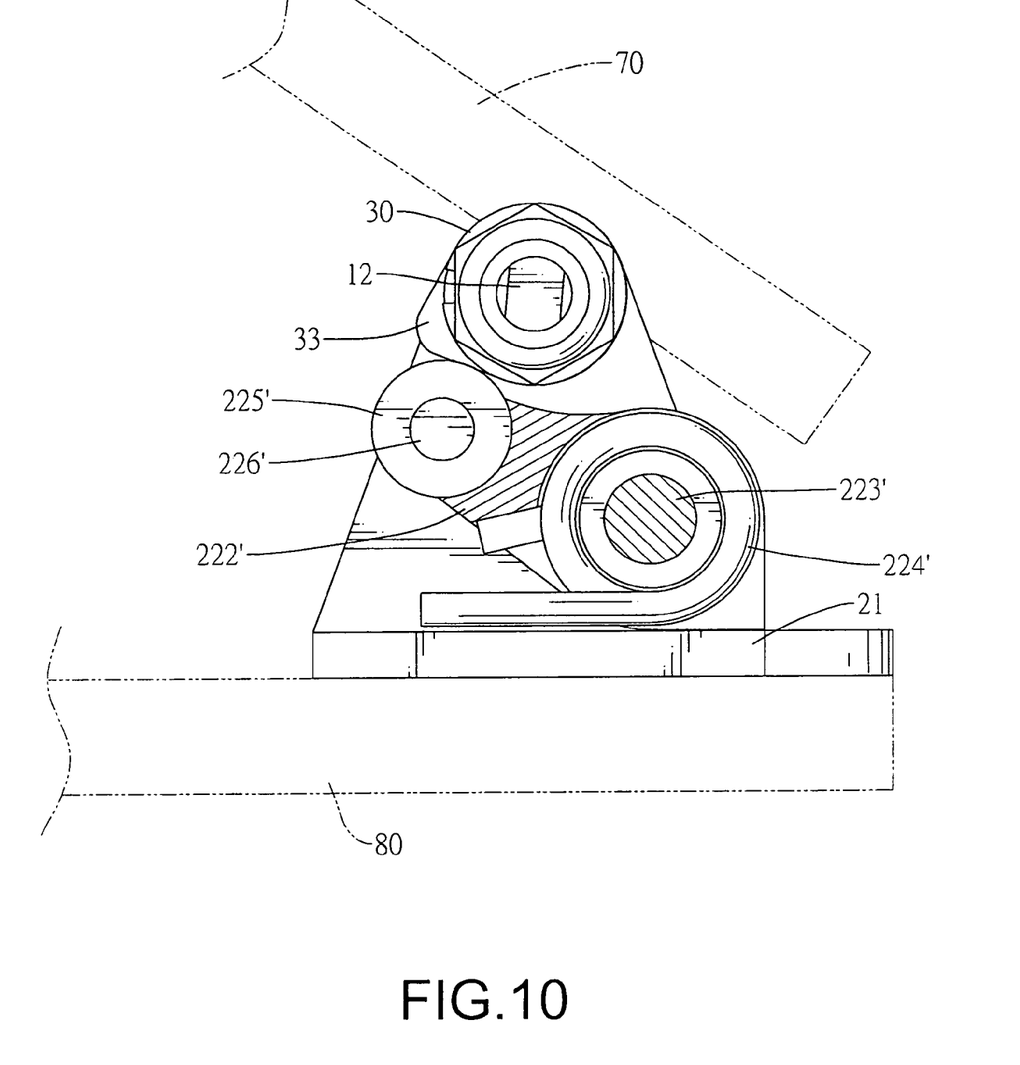
FIG. 10 is a side view of the third preferred embodiment of the pivot device in accordance with the present invention.
Figure 11:
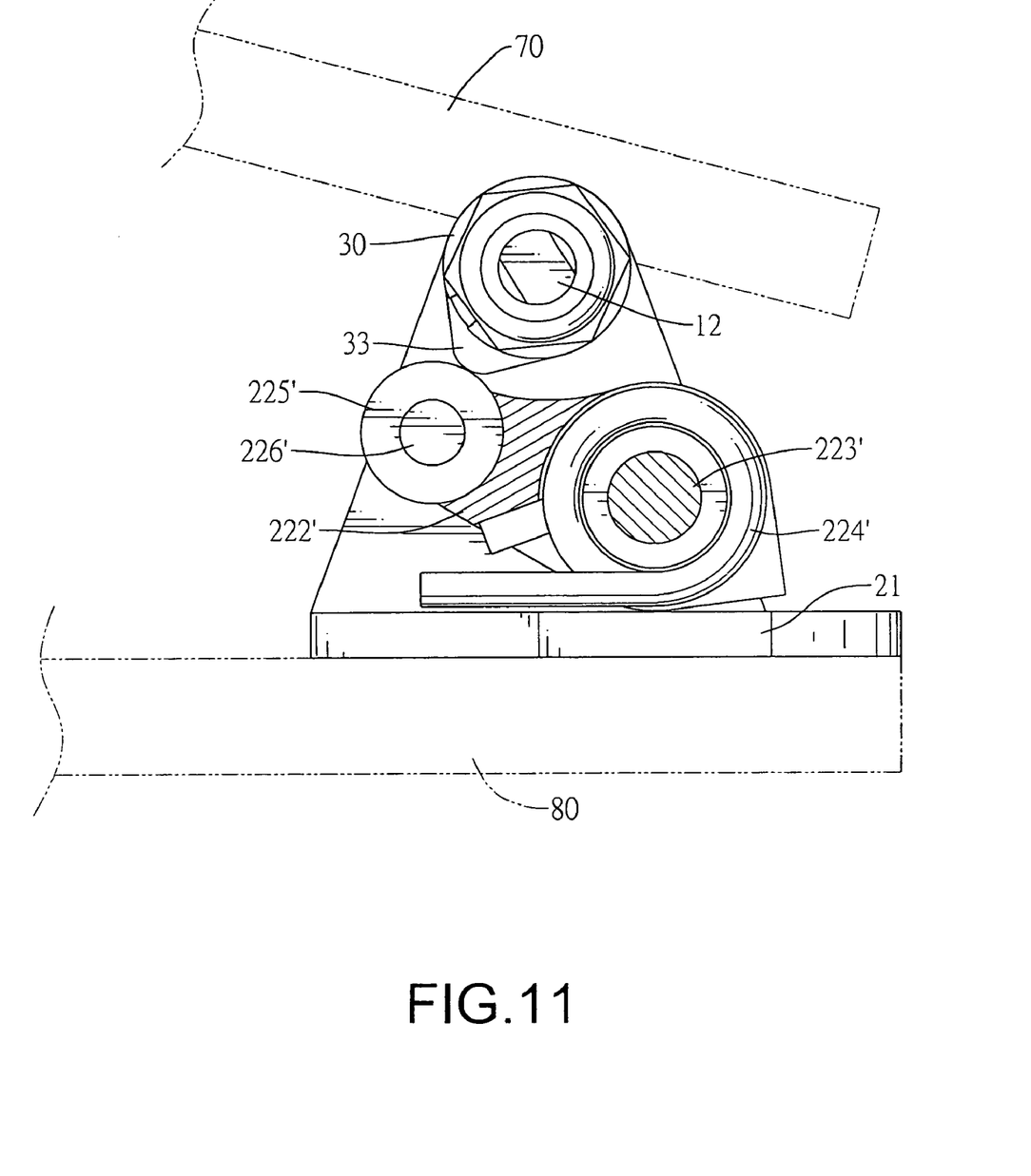
FIG. 11 is a side view of the third preferred embodiment of the pivot device in accordance with the present invention.
Figure 12:
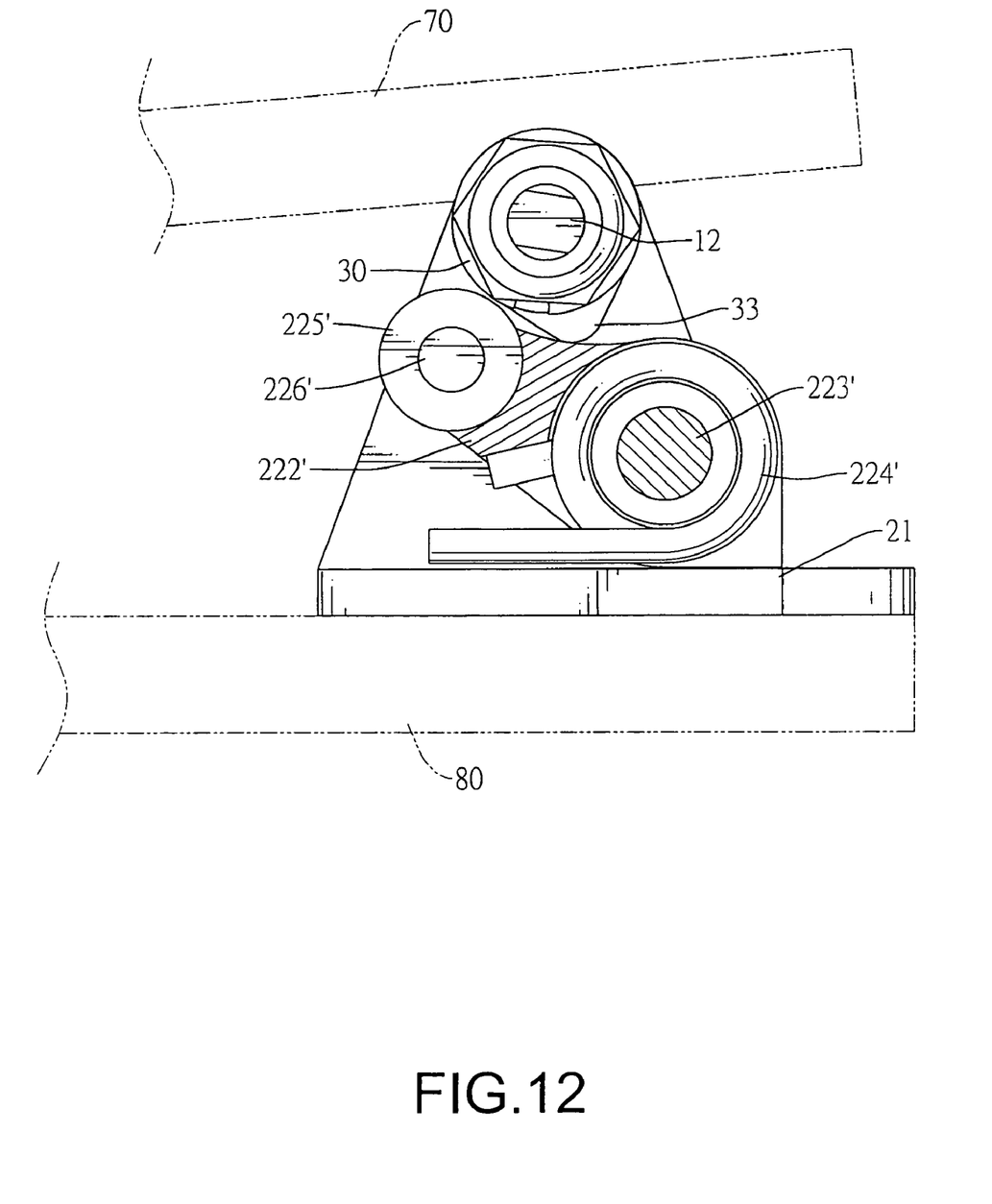
FIG. 12 is a side view of the third preferred embodiment of the pivot device in accordance with the present invention.

With reference to FIGS. 8-9, a third preferred embodiment of the pivot device is similar to the first and the second preferred embodiment except for an elastic device (22'). The elastic device (22') has a hollow barrel (221') integrally formed on a seat (20'). The barrel (221') has an open end and a female thread is formed in the open end. The barrel (221') is inserted into a bracket (222') and a first and second grooves are respectively defined in two opposed sides of the bracket (222'). A coil spring (224') is laterally mounted in the first groove of the bracket (222'), and a screw (223') is inserted longitudinally and sequentially into the first groove of the bracket (222'), the coil spring (224'), and the open end of the barrel (221') and threadedly engaged with the female thread. A top end of the coil spring (224') abuts the bracket (222') and a bottom end of the coil spring (224') abuts the base (21) to create a stored energy in the spring (224'). A collar (225') is substantially received into the second groove of the bracket (222') and a pin (226') is inserted into the collar (225') and the second groove whereby the collar (225') is secured to the bracket (222'). With reference to FIGS. 9-12, when the cover (70) is descending to the chassis (80) and certain portion of the lug (32) is inserted into the cutout (232), the nub (33) is pressed by the collar (225'). The nub (33) is pressed against the collar (225') downwardly by the user to overcome the stored energy of the coiled spring (222). Hence, the cover (70) can be raised from lowered to the chassis (80).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A pivot device comprising:
    a pivot axle (10) having a shank (12) formed on an end thereof;
    a seat (20, 20a, 20') having a base (21) and an elastic device (22, 22') mounted on the base (21);
    a first ring (30) provided on the elastic device (22, 22'), and an opening (31) configured to drivingly mate with the shank (12) and defined in a center thereof, two lugs (32) formed on two diametrically opposed sides of the first ring (30) and respectively having two arcuate opposed ends, and a perpendicular nub (33) formed on an outer circumference of the first ring (30), whereby the shank (12) is inserted into the first ring (30) and the nub (33) is pressed against the elastic device (22, 22');
    a second ring (23) formed on the base (21) and upwardly disposed on a top end of the elastic device (22, 22') and having a hole (231) defined in a center thereof, two opposed cutouts (232) respectively defined in two diametrically opposed sides of the second ring (23) and facing the elastic device (22, 22') and corresponding to the lugs (32), two arcuate ends formed on two opposed sides of each cutout (23), whereby the shank (12) is inserted into the second ring (23) via the hole (231), wherein the shank (12) is sequentially inserted into multiple resilient disks (40), a washer (50) and a fastener (60), and the fastener (60) is securely provided on a distal end of the shank (12).

2. The pivot device as claimed in claim 1, wherein the elastic device (22, 22a) has a substantially cubic block (221, 221a), a gap (221b) is defined in a top end of the cubic block (221, 221a), a coil spring (222) and a finned board (223) are respectively received into the cubic block (221, 221a), the finned board (223) is securely mounted between the coil spring (222) and an inner top wall of the cubic block (221, 221a), a rod (224) is provided in the gap (221b) and adjacent to the finned board (223), whereby the rod (224) is pressed against the nub (33).

3. The pivot device as claimed in claim 2, wherein the cubic block (221) is integrally formed on the base (21).

4. The pivot device as claimed in claim 2, wherein two parallel guide blocks (211) are respectively formed on the base (21), two slide rails (221c) are respectively formed on two lower ends of the cubic block (221a) and corresponding to the guide blocks (211), whereby the cubic block (221a) is securely mounted on the base (21) by the slide rails (221c) being mated with the guide blocks (211).

5. The pivot device as claimed in claim 2, wherein a channel (223a) is defined in a top end of the finned board (223) and corresponding to the gap (221b) and the rod (224) is mated with the channel (223a).

6. The pivot device as claimed in claim 5, wherein a plate (11) is formed in another end of the pivot axle (10), a flange is formed between the plate (11) and the shank (12) and adjacent to a side of the second ring (30) opposed to the cutouts (232), a male thread (121) is formed on the distal end of the shank (12), and the fastener (60) is a nut whereby the nut is threadedly engaged with the male thread (121).

7. The pivot device as claimed in claim 1, wherein the elastic device (22') has a hollow barrel (221') formed on the seat (20'), the barrel (221') has an open end and a female thread is formed in the open end, a bracket (222') has a first and a second grooves defined in two opposed sides thereof and the barrel (221') is inserted in the first groove, a coil spring (224') is mounted in the first groove of the bracket (222') and a screw (223') is sequentially inserted into the first groove of the bracket (222'), the coil spring (224'), and the open end of the barrel (221') and threadedly engaged with the female thread, a top end of the coil spring (224') abuts the bracket (222') and a bottom end of the coil spring (224') abuts the base (21), a collar (225') is mounted in the second groove of the bracket (222') and a pin (226') is inserted into the collar (225') and the second groove, whereby the collar (225') is securely mated with the bracket (222') and pressed by the nub (33).

* * * * *